Jan. 18, 1927.
A. BLAIR
1,614,644
LID SUPPORT
Filed Oct. 23, 1924
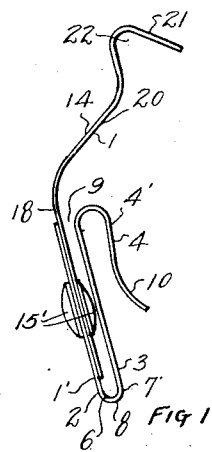
Augusta Blair
INVENTOR
BY
ATTORNEY Patented Jan. 18, 1927.

1,614,644

UNITED STATES PATENT OFFICE.

AUGUSTA BLAIR, OF CINCINNATI, OHIO.

LID SUPPORT.

Application filed October 23, 1924. Serial No. 745,515.

My invention relates to means for supporting the lids of cooking receptacles.

The object of my invention is to provide simple, convenient, efficient and economical adjustable means for maintaining the lid of a cooking receptacle in a position elevated from said receptacle.

My invention consists in providing a resilient S-shape member adapted to engage the top edge of a cooking receptacle; and in providing an upwardly extending support adjustably connected with said member, said upwardly extending support adapted to engage the rim of the lid of said receptacle and support said lid in elevated and spaced apart relation from said receptacle.

My invention, also, consists in the combination, arrangement and details of construction, as hereinafter specified and claimed.

In the drawings:

Fig. 1 is an edge elevation of the invention;

Fig. 2 is an inside elevation of the same;

Fig. 3 is a side elevation of a cooking receptacle and lid showing the receptacle partly broken away, and showing the invention in use.

In the preferred construction of my invention I provide lid support 1, as shown in Figs. 1, 2 and 3. The S-shape member 1' of the lid support, comprises integrally connected outer leg 2, intermediate leg 3 and inner leg 4, having their longitudinal edges aligned. U-shaped portion 5, of the S-shaped member, consists of legs 2 and 3, respectively, having lower ends 6 and 7 integrally connected with curved plate 8. Integral with upper end 9 of leg 3 is inner leg 4 having portion 4' aligned and extending substantially parallel with legs 2 and 3 and having its outer end 10 curved outwardly whereby upper edge 11 of cooking receptacle or pot 12 is adapted to be received intermediate legs 3 and 4 with leg 3 extending downwardly and having its lower end 7 contacting outer side 13 of the cooking receptacle.

Arm 14 is adjustably secured to leg 2 of S-shape member 1, as by suitable manually operative screw fastener 15 having a stem received in longitudinal slots at 16 and 17, respectively, in lower portion 18 and leg 2, respectively, of arm 14 and member 1', whereby when screw fastener 15 is loosened the portion 18 of support 14 is adapted to be slid longitudinally of leg 2 to a required adjusted position relative to leg 2, after which screw fastener 15 is manually tightened thereby maintaining arm 14 in fixed relation to S-shape member 1', as by frictional engagement of heads 15', respectively, with portion 18 and leg 2.

The upper portion 20 of arm 14 extends inwardly at an angle and has its upper end 21 bent to form notch 22 to receive rim 23 of lid 24, whereby, as shown in Fig. 3, when a plurality of spaced apart lid supports 1 are attached to receptacle 12, and rim 23 of lid 24 is positioned in notches 22, the lid is maintained in elevated position from the receptacle.

The lid supports 1 preferably are made of spring steel plates so that when lid 24 is in the position shown in Fig. 3, manual downward pressure on knob 25 of the lid will bend portions 20 of the supports outwardly, thereby permitting the lid to rest adjacent upper edge 11 of receptacle 12.

It is apparent that I have invented a simple and highly desirable device for the intended purposes, whereby cooking receptacles' lids can be conveniently maintained in elevated and spaced apart position relative to the tops of the receptacles.

While I have chosen to illustrate the forms and constructions of my invention by the herein drawings and explanations of the same, it is understood that my invention resides in the combination, arrangement of the parts and in the details of the construction, as hereinafter claimed. It is further understood that changes in the precise embodiment of the invention, as disclosed herein, can be made within the scope of what is claimed without departing from the sprit of the invention, as other expedients will readily suggest themselves to the art.

What I claim as new and desire to secure by Letters Patent is:

1. The combination with a cooking receptacle having a lid, of a plurality of supports, each of said supports comprising a resilient metal S-shape member consisting of integrally connected outer, intermediate and inner legs having their longitudinal edges aligned, the outer end of said inner leg being curved outwardly whereby said intermediate leg and said inner leg are adapted to receive the top edge of said receptacle there between and said S-shape member is supported with the lower end of said intermediate leg in contact with the outer side of said receptacle, said outer leg having a slot therein, an arm having a slot therein and adjustable vertically relative to said S-shape member, a screw retaining member received by said slots, to detachably connect said arm with said S-shape member, the upper portion of said arm being bent inwardly and having a groove therein to receive the rim of said lid, substantially as described.

2. The combination with a cooking receptacle having a lid, of a plurality of supports, each of said supports comprising a resilient metal S-shape member consisting of integrally connected outer, intermediate and inner legs, the outer end of said inner leg being curved outwardly and said S-shape member adapted to engage the top edge of said receptacle and be supported thereby with the lower end of said intermediate leg in contact with the outer side of said receptacle, an arm adjustable vertically relative to said S-shape member and detachably connected therewith, the upper portion of said arm being bent inwardly and having a groove therein to receive the rim of said lid, substantially as described.

3. The combination with a cooking receptacle having a lid, of a plurality of supports, each of said supports comprising an S-shape member consisting of outer, intermediate and inner legs, said S-shape member adapted to closely engage the top edge of said receptacle and be supported thereby with the lower end of said intermediate leg in contact with the outer side of said receptacle, said outer leg having a slot therein, an arm having a slot therein, a screw fastener received in said slots to secure said S-shape member in vertical adjusted relation to said arm, the upper portion of said arm being bent inwardly and having a groove therein to receive the rim of said lid, substantially as described.

AUGUSTA BLAIR.